(12) United States Patent
Wu et al.

(10) Patent No.: US 9,712,366 B2
(45) Date of Patent: Jul. 18, 2017

(54) DATA RECEIVING METHOD AND RECEIVER

(71) Applicant: Huawei Technologies Co., Ltd., Shenzhen (CN)

(72) Inventors: Dan Wu, Shenzhen (CN); Lei Chen, Shenzhen (CN); Lei Min, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/065,367

(22) Filed: Mar. 9, 2016

(65) Prior Publication Data

US 2016/0191291 A1    Jun. 30, 2016

Related U.S. Application Data

(63) Continuation of application No. PCT/CN2013/083120, filed on Sep. 9, 2013.

(51) Int. Cl.
*H04L 27/06* (2006.01)
*H04L 27/26* (2006.01)

(52) U.S. Cl.
CPC ...... *H04L 27/2649* (2013.01); *H04L 27/2602* (2013.01); *H04L 27/264* (2013.01); *H04L 27/2656* (2013.01)

(58) Field of Classification Search
CPC ............. H04L 27/2649; H04L 27/2602; H04L 27/264; H04L 27/2656; H04L 27/265; H04L 27/2655; H04L 27/2607; H04L 27/2647; H04L 2027/0095
See application file for complete search history.

(56) References Cited

U.S. PATENT DOCUMENTS

| 2003/0112912 A1* | 6/2003 | Kim ............... H04L 12/40013 375/369 |
| 2005/0238016 A1* | 10/2005 | Nishibayashi ....... H04L 1/1614 370/389 |
| 2010/0128642 A1* | 5/2010 | Bossler ............... H04W 56/009 370/280 |

(Continued)

FOREIGN PATENT DOCUMENTS

| CN | 1404307 A | 3/2003 |
| CN | 1941755 A | 4/2007 |

(Continued)

*Primary Examiner* — Khanh C Tran
(74) *Attorney, Agent, or Firm* — Leydig, Voit & Mayer, Ltd.

(57) ABSTRACT

A data receiving method and receiver are provided. A receiver determines the length of a pre-tail and the length of a post-tail of a frame by obtaining a start time and an end time of the main part of the signal of the frame at a fixed time, and determines a start time and an end time of a frame receiving window according to the start time and the end time of the main part of the signal of the frame and according to the length of the pre-tail and the length of the post-tail; and receiving a frame between the start time and the end time of the frame receiving window, so that the receiver can accurately and completely receive the main part of the signal and the pre-tail and post-tail of each frame to accurately and completely receive signals.

20 Claims, 5 Drawing Sheets

(56) References Cited

U.S. PATENT DOCUMENTS

2012/0147273 A1* 6/2012 Mourad ................... H04N 5/38
  348/723
2015/0372843 A1* 12/2015 Bala ................... H04L 25/03834
  375/295

FOREIGN PATENT DOCUMENTS

| CN | 101605116 A | 12/2009 |
| CN | 101808056 A | 8/2010 |

* cited by examiner

DATA RECEIVING METHOD AND RECEIVER

CROSS-REFERENCE TO RELATED APPLICATION

This application is a continuation of International Patent Application No. PCT/CN2013/083120 filed on Sep. 9, 2013, which is hereby incorporated by reference in its entirety.

FIELD OF THE TECHNOLOGY

The present application relates to the field of communications, and particularly to a data receiving method and a receiver.

BACKGROUND

Filter bank based multicarrier (FBMC) is an alternative transmission solution for orthogonal frequency division multiplexing (OFDM). FBMC does not need cyclic prefixes and has a good out-of-band suppression performance, and thus has a better spectral efficiency and is more flexible on spectrum usage. For this reason, FBMC is a candidate transmission solution in a future wireless communications system. For FBMC, tails would be generated in time-domain transmission signals due to the filter bank. Although a little energy is included in the tails, information included therein is still a part of information for transmission as well, and an FBMC receiver needs to receive all useful information completely and accurately.

In a conventional method, a start position and an end position of a receiving window are obtained by symbol synchronization and a relative position of a synchronization sequence in a frame structure, and a receiver receives a signal based on the start position and the end position of the receiving window. For a signal modulated by FBMC, the main portion of the signal can be determined by using the conventional method. As an FBMC signal has a pre-tail and a post-tail with variable lengths, the start position and the end position of the receiving window can not be determined accurately to completely cover the main portion as well as the pre-tail and the post-tail, thus the receiver can not accurately and completely receive the FBMC signal, resulting in a loss or a receiving error of a part of data when receiving, thereby affecting a performance of demodulating and decoding.

SUMMARY

A data receiving method and a receiver are provided according to embodiments of the invention, which can accurately and completely receive a signal main portion, a pre-tail and a post-tail of a frame, thereby receiving a signal accurately and completely, thus avoiding affecting the performance of demodulating and decoding.

A data receiving method is provided in a first aspect of the embodiments according to the present disclosure, which includes:

obtaining a start time and an end time of a signal main portion of a frame by timing synchronization;

determining a length of a pre-tail and a length of a post-tail of the frame;

determining a start time and an end time of a receiving window for the frame based on the start time and the end time of the signal main portion, the length of the pre-tail and the length of the post-tail; and receiving the frame between the start time and the end time of the receiving window for the frame.

Based on the first aspect of the embodiments according to the present disclosure, in a first implementation of the first aspect of the embodiments according to the present disclosure, the step of determining the length of the pre-tail and the length of the post-tail of the frame includes:

receiving length information of the pre-tail and length information of the post-tail of the frame, where the length information is sent by a transmitter; and determining the length of the pre-tail and the length of the post-tail of the frame based on the length information of the pre-tail and the length information of the post-tail of the frame.

Based on the first aspect of the embodiments according to the present disclosure, in a second implementation of the first aspect of the embodiments according to the present disclosure, the step of determining the length of the pre-tail and the length of the post-tail of the frame includes:

obtaining a filter parameter; and determining the length of the pre-tail and the length of the post-tail of the frame based on the filter parameter.

Based on the second implementation of the first aspect of the embodiments according to the present disclosure, in a third implementation of the first aspect of the embodiments according to the present disclosure, before the step of obtaining the filter parameter, the data receiving method further includes:

receiving information regarding the filter parameter from the transmitter.

Based on the first aspect of the embodiments according to the present disclosure, in a fourth implementation of the first aspect of the embodiments according to the present disclosure, the step of determining the length of the pre-tail and the length of the post-tail of the frame includes:

obtaining a filter parameter and truncated lengths of tails; and determining the length of the pre-tail and the length of the post-tail of the frame based on the filter parameter and the truncated lengths of the tails, where the truncated lengths of the tails include a truncated length of the pre-tail and a truncated length of the post-tail.

Based on the fourth implementation of the first aspect of the embodiments according to the present disclosure, in a fifth implementation of the first aspect of the embodiments according to the present disclosure, the step of determining the length of the pre-tail and the length of the post-tail of the frame based on the filter parameter and the truncated lengths of the tails includes:

determining for the frame a length of the pre-tail before being truncated and a length of the post-tail before being truncated based on the filter parameter; and determining the length of the pre-tail and the length of the post-tail of the frame based on the length of the pre-tail before being truncated, the length of the post-tail before being truncated and the truncated lengths of the tails.

Based on the fourth or the fifth implementation of the first aspect of the embodiments according to the present disclosure, in a sixth implementation of the first aspect of the embodiments according to the present disclosure, before the step of obtaining the filter parameter and the truncated lengths of the tails, the data receiving method further includes:

receiving information regarding the filter parameter and/or information regarding the truncated lengths of tails, from the transmitter.

A receiver is provided according to a second aspect of the embodiments according to the present disclosure, where the receiver includes:

an obtaining unit, configured to obtain a start time and an end time of a signal main portion of a frame by timing synchronization;

a first determining unit, configured to determine a length of a pre-tail and a length of a post-tail of the frame;

a second determining unit, configured to determine a start time and an end time of a receiving window for the frame based on the start time and the end time of the signal main portion, the length of the pre-tail and the length of the post-tail; and a receiving unit, configured to receive the frame between the start time and the end time of the receiving window for the frame.

Based on the second aspect of the embodiments according to the present disclosure, in a first implementation of the second aspect of the embodiments according to the present disclosure, the first determining unit includes:

a first receiving module, configured to receive length information of the pre-tail and length information of the post-tail of the frame, where the length information is sent by a transmitter; and a first determining module, configured to determine the length of the pre-tail and the length of the post-tail of the frame based on the length information of the pre-tail and the length information of the post-tail of the frame.

Based on the second aspect of the embodiments according to the present disclosure, in a second implementation of the second aspect of the embodiments according to the present disclosure, the first determining module includes:

a first obtaining module, configured to obtain a filter parameter; and a second determining module, configured to determine the length of the pre-tail and the length of the post-tail of the frame based on the filter parameter.

Based on the second implementation of the second aspect of the embodiments according to the present disclosure, in a third implementation of the second aspect of the embodiments according to the present disclosure, the first determining unit further includes:

a second receiving module, configured to receive information regarding the filter parameter from a transmitter.

Based on the second aspect of the embodiments according to the present disclosure, in a fourth implementation of the second aspect of the embodiments according to the present disclosure, the first determining unit includes:

a second obtaining module, configured to obtain a filter parameter and truncated lengths of tails; and a third determining module, configured to determine the length of the pre-tail and the length of the post-tail of the frame based on the filter parameter and the truncated lengths of the tails, where the truncated lengths of the tails include a truncated length of the pre-tail and a truncated length of the post-tail.

Based on the fourth implementation of the second aspect of the embodiments according to the present disclosure, in a fifth implementation of the second aspect of the embodiments according to the present disclosure, the third determining module includes:

a first processing module, configured to determine for the frame a length of the pre-tail before being truncated and a length of the post-tail before being truncated based on the filter parameter; and a second processing module, configured to determine the length of the pre-tail and the length of the post-tail of the frame based on the length of the pre-tail before being truncated, the length of the post-tail before being truncated and the truncated lengths of the tails.

Based on the fourth or the fifth implementation of the second aspect of the embodiments according to the present disclosure, in a sixth implementation of the second aspect of the embodiments according to the present disclosure, the first determining unit further includes:

a third receiving module, configured to receive information regarding the filter parameter and/or information regarding the truncated lengths of the tails, from the transmitter.

A receiver is provided according to a third aspect of the embodiments according to the present disclosure, where the receiver includes:

a processor and a memory configured to store codes, where the processor is configured to perform the following steps when executing the codes:

obtaining a start time and an end time of a signal main portion of a frame by timing synchronization, determining a length of a pre-tail and a length of a post-tail of the frame, determining a start time and an end time of a receiving window for the frame based on the start time and the end time of the signal main portion, the length of the pre-tail and the length of the post-tail, and receiving the frame between the start time and the end time of the receiving window for the frame.

Based on the third aspect of the embodiments according to the present disclosure, in a first implementation of the third aspect of the embodiments according to the present disclosure, the processor is further configured to:

receive length information of the pre-tail and length information of the post-tail of the frame, sent from a transmitter; and determine the length of the pre-tail and the length of the post-tail of the frame based on the length information of the pre-tail and the length information of the post-tail of the frame.

Based on the third aspect of the embodiments according to the present disclosure, in a second implementation of the third aspect of the embodiments according to the present disclosure, the processor is further configured to:

obtain a filter parameter; and determine the length of the pre-tail and the length of the post-tail of the frame based on the filter parameter.

Based on the second embodiment of the third aspect of the embodiments according to the present disclosure, in a third embodiment of the third aspect of the embodiments according to the present disclosure, the processor is further configured to:

receive information regarding the filter parameter from a transmitter.

Based on the third aspect of the embodiments according to the present disclosure, in a fourth implementation of the third aspect of the embodiments according to the present disclosure, the processor is further configured to:

obtain a filter parameter and truncated lengths of tails; and determine the length of the pre-tail and the length of the post-tail of the frame based on the filter parameter and the truncated lengths of the tails, where the truncated lengths of the tails include a truncated length of the pre-tail and a truncated length of the post-tail.

Based on the fourth implementation of the third aspect of the embodiments according to the present disclosure, in a fifth implementation of the third aspect of the embodiments according to the present disclosure, the processor is further configured to:

determine for the frame a length of the pre-tail before being truncated and a length of the post-tail before being truncated based on the filter parameter; and determine the length of the pre-tail and the length of the post-tail of the frame based on the length of the pre-tail before being truncated, the length of the post-tail before being truncated and the truncated lengths of the tails.

Based on the fourth or the fifth implementation of the third aspect of the embodiments according to the present disclosure, in a sixth implementation of the third aspect of the embodiments according to the present disclosure, the processor is further configured to:

receive information regarding the filter parameter and/or information regarding the truncated lengths of the tails, which are sent by the transmitter.

As can be seen from the technical solutions above, the embodiments according to present disclosure have the following advantages:

in the embodiments according to the present disclosure, the receiver obtains the start time and the end time of the signal main portion of the frame by timing synchronization, determines the length of the pre-tail and the length of the post-tail of the frame, determines the start time and the end time of the receiving window for the frame based on the start time and the end time of the signal main portion, the length of the pre-tail and the length of the post-tail, and receives the frame during a period from the start time to the end time of the receiving window for the frame, thus the receiver can accurately and completely receive the signal main portion, the pre-tail and the post-tail of the frame, thereby receiving a signal accurately and completely and avoiding affecting the performance of demodulating and decoding.

DETAILED DESCRIPTION OF THE EMBODIMENTS

A data receiving method and a receiver are provided according to the embodiments of the invention, which can accurately and completely receive a signal main portion, a pre-tail and a post-tail of each frame, thereby receiving a signal accurately and completely, thus avoiding affecting the performance of demodulating and decoding.

Figure 1:
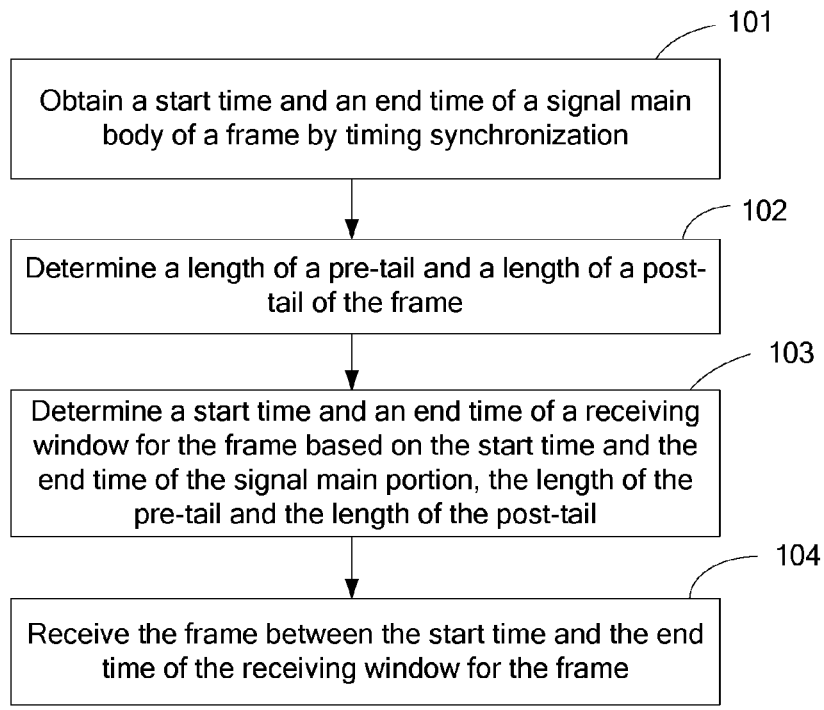
FIG. 1 is a schematic diagram of a data receiving method according to an embodiment of the invention.

Referring to FIG. 1, a data receiving method according to an embodiment of the invention includes the following steps.

Step 101, obtaining a start time and an end time of a signal main portion of a frame by timing synchronization.

In the embodiment, a calculation method for obtaining the start time and the end time of the signal main portion of the frame by timing synchronization belongs to conventional technology. In practical applications, if the frame is a wireless frame, a receiver can detect a start time and an end time of a synchronization signal via an inserted synchronization channel, thus the receiver can obtain the start time and the end time of the signal main portion of the frame where the synchronization channel locates based on the start time and the end time of the synchronization signal and a relative position of the synchronization in the frame structure.

Step 102, determining a length of a pre-tail and a length of a post-tail of the frame.

In the embodiment, tails of the frame may be truncated or non-truncated. For example, in an FBMC system operating in a frequency division duplex (FDD) mode, two adjacent frames overlap with each other, and a tail of a frame overlaps with a useful signal of a previous or following frame, which results in no extra overhead, thus the tail is not required to be truncated. While in a case that an FBMC system operating in a time division duplex (TDD) mode switches between uplink and downlink, a tail of a frame would not overlap with any other useful signal, and the tail exclusively occupies a period of transmission time, which results in overhead on data transmission, therefore the tail is required to be truncated. Thus, the receiver determines the length of the pre-tail and the length of the post-tail of the frame where the synchronization channel locates in cases that the pre-tail and post-tail of the frame are truncated and the pre-tail and post-tail of the frame are non-truncated.

Step 103, determining a start time and an end time of a receiving window for the frame based on the start time and the end time of the signal main portion, the length of the pre-tail and the length of the post-tail.

In the embodiment, one frame includes three parts: the signal main portion, the pre-tail and the post-tail, where most of energy of the frame is included in the signal main portion. Generally, a part in front of the signal main portion is defined as the pre-tail and a part of the frame following the signal main portion is defined as the post-tail. Thus the receiver can determine the start time and the end time of the receiving window for the frame after determining the start time and the end time of the signal main portion, the length of the pre-tail and the length of the post-tail. In practical applications, a start time of the frame is determined to be the start time of the receiving window for the frame, and an end time of the frame is determined to be the end time of the receiving window for the frame.

Figure 2:
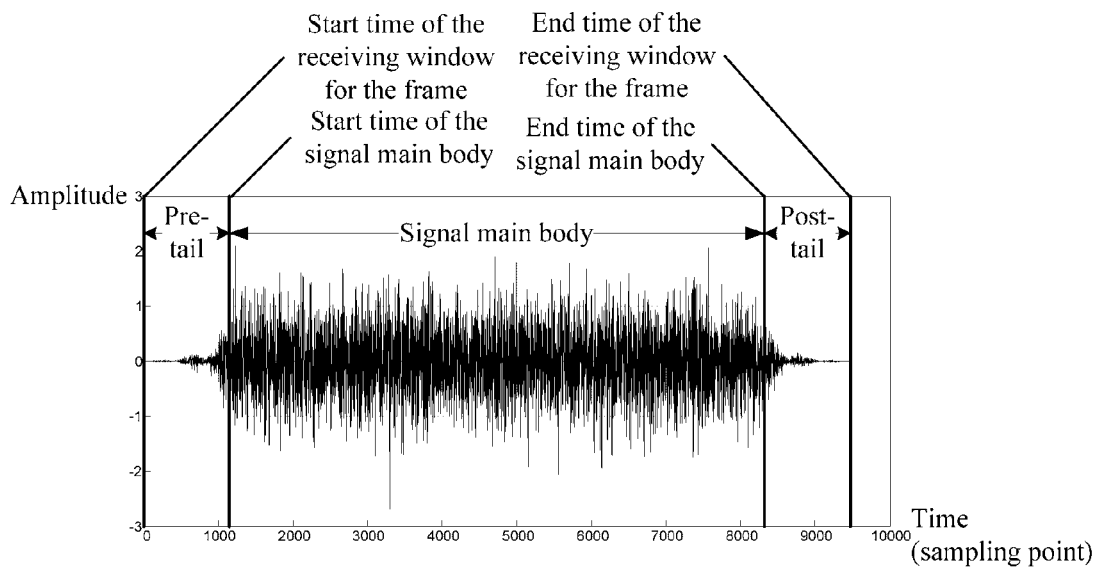
FIG. 2 is a schematic diagram of a signal frame according to an embodiment of the invention.

A structure of the signal frame is described hereinafter. Referring to FIG. 2, the abscissa in FIG. 2 is time represented by serial numbers of sampling points, and the ordinate is amplitude. The frame includes the pre-tail, the signal main portion and the post-tail. In conventional technology, the start time of the receiving window for the frame is the start time of the whole frame, and the end time of the receiving window for the frame is the end time of the whole frame. In FIG. 2 of the embodiment, the receiving window for the frame covers the pre-tail, the signal main portion and the post-tail of the frame, where the start time of the receiving window for the frame is 0 and the end time of the receiving window is 9500.

Step 104, receiving the frame between the start time and the end time of the receiving window for the frame.

In the embodiment, the receiver can receive the frame during a period from the start time to the end time of the receiving window for the frame.

In the embodiment, the receiver obtains the start time and the end time of the signal main portion of the frame by timing synchronization, determines the length of the pre-tail and the length of the post-tail of the frame, determines the start time and the end time of the receiving window for the frame based on the start time and the end time of the signal main portion, the length of the pre-tail and the length of the post-tail, and receives the frame during a period from the start time to the end time of the receiving window for the frame, thus the receiver can accurately and completely receive the signal main portion together with the pre-tail and the post-tail of the frame, thereby receiving the signal accurately and completely and avoiding affecting the performance of demodulating and decoding.

Figure 3:
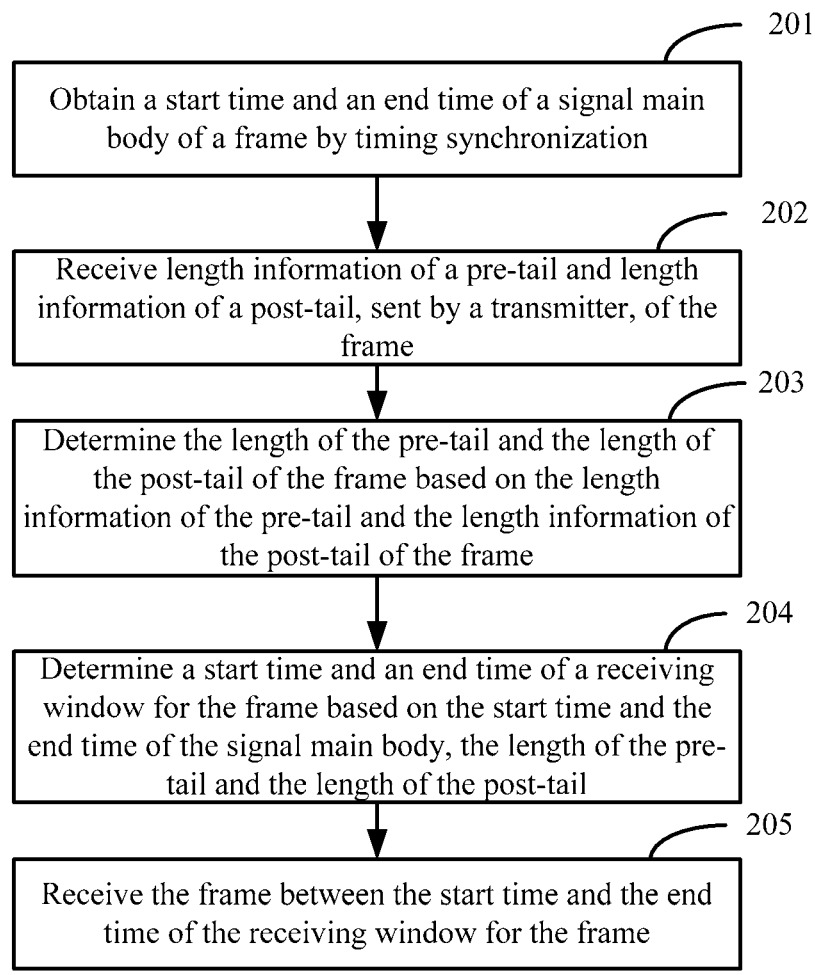
FIG. 3 is a schematic diagram of a data receiving method according to another embodiment of the invention.

For ease of understanding, a data receiving method according to an embodiment of the invention is described hereinafter with a specific example. Referring to FIG. 3, the data receiving method according to another embodiment of the invention includes the following steps.

Step 201, obtaining a start time and an end time of a signal main portion of a frame by timing synchronization.

In the embodiment, the way to achieve the time synchronization is not limited. In practical applications, in a case that the frame is a wireless frame, a receiver can detect a start time and an end time of a synchronization signal via an inserted synchronization channel, and obtain the start time and the end time of the signal main portion of the frame based on the start time and the end time of the synchronization signal.

The way to insert the synchronization is not limited herein. A corresponding synchronization channel may be inserted in each wireless frame, or synchronization channels may be inserted by following a certain rule. For example, in a case that a transmitter sends 5 wireless frames, the transmitter may insert synchronization channels in a first, a third and a fifth wireless frame, or insert a synchronization channel in the first wireless frame. Thus, the receiver can obtain a start time and an end time of a signal main portion of the first wireless frame, and obtain start times and end times of signal main portions of the other four wireless frames since each frame has a fixed length.

Step 202, receiving length information of a pre-tail and length information of a post-tail of the frame, where the length information is sent by a transmitter.

Step 203, determining the length of the pre-tail and the length of the post-tail of the frame based on the length information of the pre-tail and the length information of the post-tail of the frame.

In the embodiment, the receiver can receive from the transmitter the length information of the pre-tail and the length information of the post-tail of the frame, and determine the length of the pre-tail and the length of the post-tail of the frame.

Step 204, determining a start time and an end time of a receiving window for the frame based on the start time and the end time of the signal main portion, the length of the pre-tail and the length of the post-tail.

In the embodiment, the frame includes three parts: the signal main portion, the pre-tail and the post-tail, where most of energy of the frame is included in the signal main portion. Generally, a part of the frame in front of the signal main portion is defined as the pre-tail and a part of the frame following the signal main portion is defined as the post-tail. Thus the receiver can determine the start time and the end time of the receiving window for the frame after determining the start time and the end time of the signal main portion together with the length of the pre-tail and the length of the post-tail. In practical applications, a start time of the frame is determined to be the start time of the receiving window for the frame, and an end time of the frame is determined to be the end time of the receiving window for the frame.

Step 205, receiving the frame between the start time and the end time of the receiving window for the frame.

In the embodiment, the receiver can receive the frame during a period from the start time to the end time of the receiving window for the frame.

In the embodiment, the receiver obtains the start time and the end time of the signal main portion of the frame by timing synchronization, receives from the transmitter the length information of the pre-tail and the length information of the post-tail of the frame, determines the length of the pre-tail and the length of the post-tail of the frame based on the length information of the pre-tail and the length information of the post-tail of the frame, determines the start time and the end time of the receiving window for the frame based on the start time and the end time of the signal main portion together with the length of the pre-tail and the length of the post-tail and receives the frame during a period from the start time to the end time of the receiving window for the frame. Thus the receiver can directly obtain the lengths of the tails without complicated computation, not only the signal main portion, the pre-tail and the post-tail of the frame can be received accurately and completely but also the receiving process is simplified, thereby receiving a signal accurately and completely and avoiding affecting the performance of demodulating and decoding.

Figure 4:
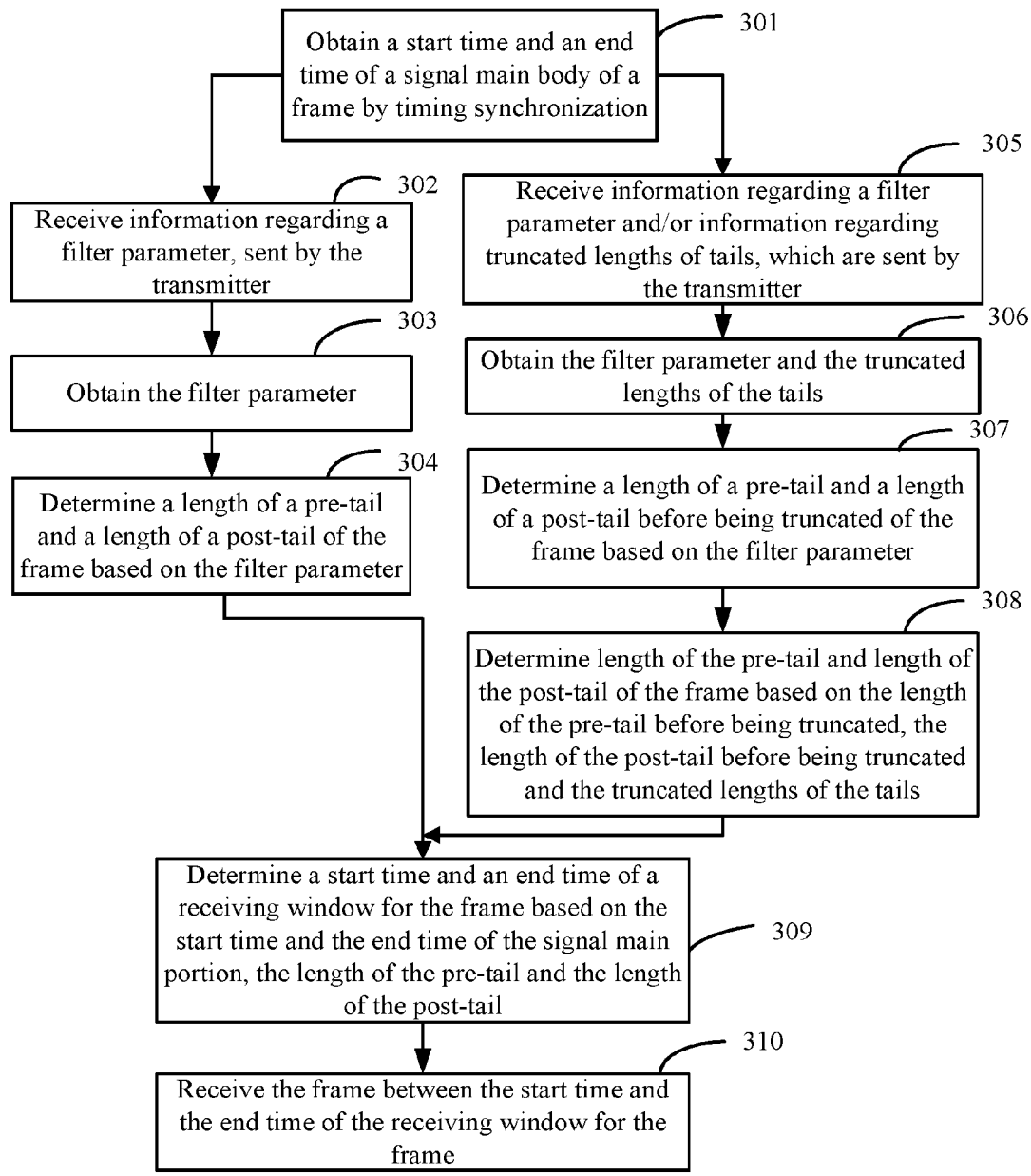
FIG. 4 is a schematic diagram of a data receiving method according to yet another embodiment of the invention.

A data receiving method according to an embodiment of the invention is described hereinafter in conjunction with another particular example. Referring to FIG. 4, the data receiving method according to another embodiment of the invention includes the following steps.

Step 301, obtaining a start time and an end time of a signal main portion of a frame by timing synchronization.

In the embodiment, the time synchronization is achieved, and the start time and the end time of the signal main portion of the frame are obtained by the timing synchronization. In practical applications, in a case that the frame is a wireless frame, the timing synchronization can be achieved by inserting a synchronization channel. For example, it is assumed that a synchronization sequence is inserted in an $S_0$-th symbol of the wireless frame, a receiver can detect a synchronization signal via the synchronization sequence only, and achieve the timing synchronization based on the synchronization signal. Then the receiver can calculate the start time $T_{-1}$, which is in the units of time, of the signal main portion of the frame where the synchronization channel locates according to the formula $T_{-1}=T_0-(S_0-1)*M*T_s/2$, and the end time $T_1$, which is in the units of time, of the signal main portion of the frame where the synchronization channel locates according to the formula $T_1=T_0+(N_s-S_0)*M*T_s/2$, where $T_0$ is a start time, captured by the receiver, of the synchronization sequence inserted in the $S_0$-th symbol, M is a quantity of subcarriers in each symbol, $T_s$ is a sampling interval and $N_s$ is a quantity of symbols included in the frame where the synchronization channel locates. The receiver may calculate the start time $N_{-1}$, which is in units of sampling point quantity, of the signal main portion of the frame where the synchronization channel locates according to the formula $N_{-1}=N_0-(S_0-1)*M*/2$, and the end time $N_1$, which is in units of sampling point quantity, of the signal main portion of the frame according to the formula $N_1=N_0+(N_s-S_0)*M/2$, where M is a quantity of subcarriers in each symbol and $N_0$ represents a start sampling point in the synchronization sequence.

In a case that a transmitter sends multiple wireless frames to the receiver, the way to insert the synchronization is not limited. A corresponding synchronization channel may be inserted in each of the multiple wireless frames, or synchronization channels may be inserted by following a certain rule, or only the first of the multiple wireless frames is inserted with a synchronization channel. For example, in a case that a transmitter sends 5 wireless frames, the transmitter may insert synchronization channels in a first, a third and a fifth wireless frame, or insert a synchronization channel in the first wireless frame. Thus, the receiver can obtain a start time and an end time of a signal main portion of the first wireless frame, and obtain start times and end times of signal main portions of the other four wireless frames since each wireless frame has a fixed length.

Step 302, receiving information regarding a filter parameter, sent by the transmitter.

Step 303, obtaining the filter parameter.

In the embodiment, if the receiver determines that tails of the frame are non-truncated, the receiver obtains the filter parameter, where the way to obtain the filter parameters is not limited herein. In practical applications, the receiver can receive the filter parameter from the transmitter, or the receiver and the transmitter can negotiate a fixed value and store the fixed value in the receiver. In the description of the embodiment, the case of receiving the information regarding the filter parameter sent by the transmitter is taken for example.

Step 304, determining a length of a pre-tail and a length of a post-tail of the frame based on the filter parameter.

In the embodiment, if the receiver determines that the tails of the frame are non-truncated, the receiver can determine the length of the pre-tail and the length of the post-tail of the frame based on the filter parameter. For example, the receiver can calculate the length $T_{pre\text{-}tail}$ of the pre-tail and the length $T_{post\text{-}tail}$ of the post-tail, which are in the units of time, according to the formula $T_{pre\text{-}tail}=T_{post\text{-}tail}=(K-1/2)*M*T_s/2$, or calculate the length $N_{pre\text{-}tail}$ of the pre-tail and the length $N_{post\text{-}tail}$ of the post-tail, which are in the units of sampling point quantity, according to the formula $N_{pre\text{-}tail}=N_{post\text{-}tail}=(K-1/2)*M/2$, where M is a quantity of subcarriers in each symbol, $T_s$ is the sampling interval and K is a filter overlap coefficient which is a kind of the filter parameter.

Step 305, receiving information regarding a filter parameter and/or information regarding truncated lengths of tails, which are sent by the transmitter.

Step 306, obtaining the filter parameter and the truncated lengths of the tails.

In the embodiment, if the receiver determines that the tails of the frame are truncated, the receiver receives the filter parameter and the truncated lengths of the tails, where the truncated lengths of the tails include a truncated length of the pre-tail and a truncated length of the post-tail. The way to obtain the filter parameter and the truncated lengths of the tails is not limited. The receiver may receive from the transmitter the information regarding the filter parameter and/or the information regarding the truncated lengths of the tails, or the receiver may directly obtain the information regarding the filter parameter and/or the information regarding the truncated lengths of the tails stored in the receiver, where the truncated lengths of the tails are stored in the receiver as fixed parameters and a fixed value may be negotiated for the filter parameter by the transmitter and the receiver and stored in the receiver.

Step 307, determining a length of a pre-tail and a length of a post-tail before being truncated of the frame based on the filter parameter.

Step 308, determining a length of the pre-tail and a length of the post-tail of the frame based on the length of the pre-tail before being truncated, the length of the post-tail before being truncated and the truncated lengths of the tails.

In the embodiment, if the receiver determines that the tails of the frame are truncated, the receiver determines the length of the pre-tail before being truncated and the length of the post-tail before being truncated based on the filter parameter, and then determines the length of the pre-tail and the length of the post-tail based on the length of the pre-tail before being truncated and the length of the post-tail before being truncated. For example, assuming that the truncated length of the pre-tail is $\Delta T_{pre}$ and the truncated length of the post-tail is $\Delta T_{post}$, the length of the pre-tail before being truncated and the length of the post-tail before being truncated, which are in the units of time, are calculated from the formula $(K-1/2)*M*T_s/2$, or the length of the pre-tail before being truncated and the length of the post-tail before being truncated, which are in units of sampling point quantity, are calculated from the formula $(K-1/2)*M/2$. Then the length $T_{pre\text{-}tail}$ of the pre-tail and the tai length $T_{post\text{-}tail}$ of the post-tail, which are in the units of time, are calculated according to the formulas $T_{pre\text{-}tail}=(K-1/2)*M*T_s/2-\Delta T_{pre}$ and $T_{post\text{-}tail}=(K-1/2)*M*T_s/2-\Delta T_{post}$, respectively, or assuming that the truncated length of the pre-tail is $\Delta N_{pre}$ and the truncated length of the post-tail is $\Delta N_{post}$, the length $N_{pre\text{-}tail}$ of the pre-tail and the length $N_{post\text{-}tail}$ of the post-tail, which are in units of sampling point quantity, are calculated according to the formulas $N_{pre\text{-}tail}=(K-1/2)*M/2-\Delta N_{pre}$ and $N_{post\text{-}tail}=(K-1/2)*M/2-\Delta N_{post}$, respectively, where M is a quantity of subcarriers in each symbol, $T_s$ is the sampling interval and K is the filter overlap coefficient, which is a kind of the filter parameter.

Step 309, determining a start time and an end time of a receiving window for the frame based on the start time and the end time of the signal main portion, the length of the pre-tail and the length of the post-tail.

In the embodiment, the receiver can determine the start time and the end time of the receiving window for the frame after obtaining the start time and the end time of each of the three parts included in the frame. In practical applications, a start time of the frame is determined to be the start time of the receiving window for the frame, and an end time of the frame is determined to be the end time of the receiving window for the frame. For example, the receiver may calculate the start time $T_{-2}$ and the end time $T_2$ of the frame, which are in the units of time, according to the formulas $T_{-2}=T_{-1}-T_{pre\text{-}tail}$ and $T_2=T_1+T_{post\text{-}tail}$, respectively, where $T_{-1}$ and $T_1$ are the start time and the end time of the signal main portion calculated in step 301, respectively, and $T_{pre\text{-}tail}$ and $T_{post\text{-}tail}$ are the length of the pre-tail and the length of the post-tail calculated in step 304 or 308. Or the receiver may calculate the start time $N_2$ and the end time $N_2$ of the frame, which are in units of sampling point quantity, according to the formulas $N_{-2}=N_{-1}-N_{pre\text{-}tail}$ and $N_2=N_1+N_{post\text{-}tail}$, respectively, where $N_{-1}$ and $N_1$ are the start time and the end time of signal main portion calculated in step 301, respectively, and $N_{pre\text{-}tail}$ and $N_{post\text{-}tail}$ are the length of the pre-tail and the length of the post-tail calculated in step 304 or 308.

Step 310, receiving the frame between the start time and the end time of the receiving window for the frame.

In the embodiment, after determining the start time and the end time of the receiving window for the frame in step 309, the receiver can start to receive the frame at the start time and end the receiving at the end time, thereby accurately and completely receiving the frame.

In the embodiment, the start time and the end time of the signal main portion are obtained by timing synchronization, the length of the pre-tail and the length of the post-tail are determined in cases of truncated tails and non-truncated tails, the start time and the end time of the receiving window for the frame are determined based on the start time and the end time of the signal main portion together with the length of the pre-tail and the length of the post-tail, and the frame is received between the start time and the end time of the receiving window for the frame. Thus the receiver can accurately and completely receive the signal main portion, the pre-tail and the post-tail of the frame, thereby receiving a signal accurately and completely and avoiding affecting the performance of demodulating and decoding.

Figure 5:
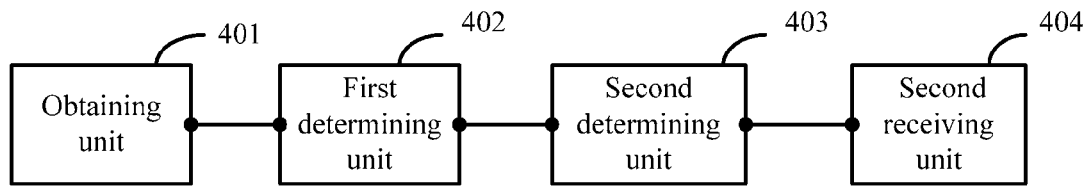
FIG. 5 is a schematic diagram of a receiver according to an embodiment of the invention.

A receiver configured to perform the above method according to the embodiments of the invention is described hereinafter. Reference can be made to FIG. 5 for a basic logical structure of the receiver. The receiver according to an embodiment of the invention includes:

an obtaining unit 401, a first determining unit 402, a second determining unit 403 and a receiving unit 404; where the obtaining unit 401 is configured to obtain a start time and an end time of a signal main portion of a frame by timing synchronization;

the first determining unit 402 is configured to determine a length of a pre-tail and a length of a post-tail of the frame;

the second determining unit 403 is configured to determine a start time and an end time of a receiving window for the frame based on the start time and the end time of the signal main portion, the length of the pre-tail and the length of the post-tail; and the receiving unit 404 is configured to receive the frame between the start time and the end time of the receiving window for the frame.

In the embodiment, the obtaining unit 401 obtains the start time and the end time of the signal main portion of the frame by timing synchronization, the first determining unit 402 determines the length of the pre-tail and the length of the post-tail of the frame, the second determining unit 403 determines the start time and the end time of the receiving window for the frame based on the start time and the end time of the signal main portion, the length of the pre-tail and the length of the post-tail, and the receiving unit 404 receives the frame between the start time and the end time of the receiving window for the frame. Thus the receiver can accurately and completely receive the signal main portion, the pre-tail and the post-tail of the frame, thereby receiving a signal accurately and completely and avoiding affecting the performance of demodulating and decoding.

Figure 6:
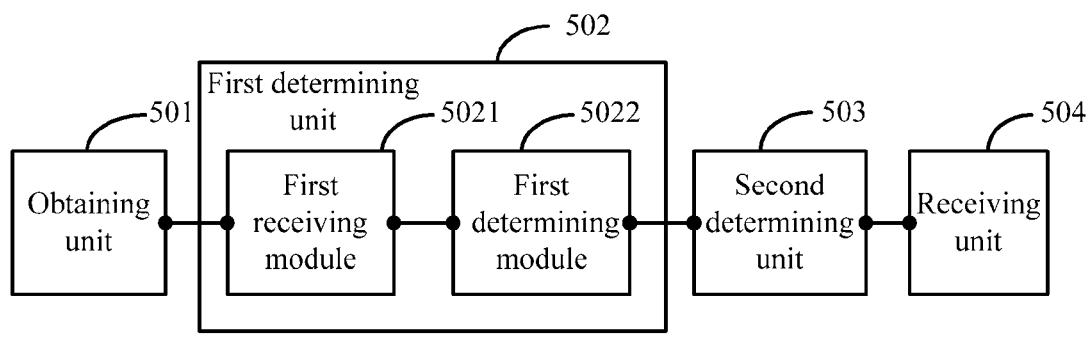
FIG. 6 is a schematic diagram of a receiver according to another embodiment of the invention.

For understanding the above embodiment better, data interaction in the receiver is described hereinafter with interactions between modules and units in the receiver in a case that a transmitter sends lengths of tails of a frame. Referring to FIG. 6, the receiver includes:

an obtaining unit 501, a first determining unit 502, a second determining unit 503 and a receiving unit 504, where the first determining unit includes a first receiving module 5021 and a first determining module 5022.

The obtaining unit 501 is configured to obtain a start time and an end time of a signal main portion of the frame by timing synchronization. For example, in a case that the frame is a wireless frame, the obtaining unit 501 can detect a start time and an end time of a synchronization signal via an inserted synchronization channel, obtain the start time and the end time of the signal main portion of the frame based on the start time and the end time of the synchronization signal, and then send the start time and the end time of the signal main portion of the frame to the second determining unit 5022.

The first receiving module 5021 is configured to receive from a transmitter length information of a pre-tail and length information of a post-tail of the frame, and send the length information of the pre-tail and the length information of the post-tail to the first determining module 5022.

The first determining module 5022 is configured to determine a length of the pre-tail and a length of the post-tail of the frame based on the length information of the pre-tail and the length information of the post-tail of the frame, and send the length of the pre-tail and the length of the post-tail of the frame to the second determining unit 503.

The second determining unit 503 is configured to determine a start time and an end time of a receiving window for the frame based on the start time and the end time of the signal main portion, the length of the pre-tail and the length of the post-tail, and send the start time and the end time of the receiving window for the frame to the receiving unit 504.

The receiving unit 504 is configured to receive the frame between the start time and the end time of the receiving window for the frame.

In the embodiment, the obtaining unit 501 obtains the start time and the end time of the signal main portion of the frame by timing synchronization, the first receiving module 5021 receives the length information of the pre-tail and the length information of the post-tail, sent by the transmitter, of the frame, the first determining module 5022 determines the length of the pre-tail and the length of the post-tail of the frame based on the length information of the pre-tail and the length information of the post-tail, the second determining unit 503 determines the start time and the end time of the receiving window for the frame based on the start time and the end time of the signal main portion, the length of the pre-tail and the length of the post-tail, and the receiving unit 504 receives the frame between the start time and the end time of the receiving window for the frame. Thus the lengths of the tails can be obtained from the transmitter by the first receiving module 5021 and the first determining module 5022 without complicated computation, not only the signal main portion, the pre-tail and the post-tail of the frame can be received accurately and completely but also the receiving process is simplified, thereby receiving a signal accurately and completely and avoiding affecting the performance of demodulating and decoding.

Figure 7:
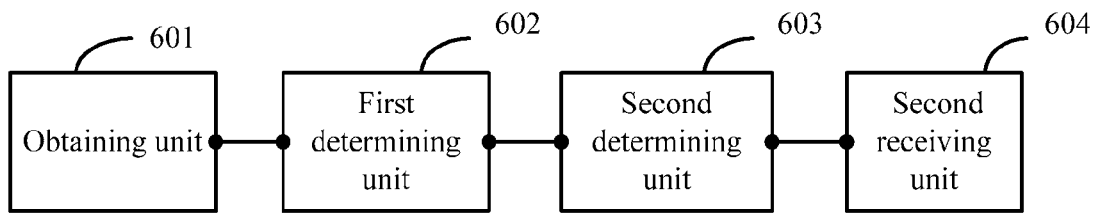
FIG. 7 is a schematic diagram of a receiver according to yet another embodiment of the invention.

Data interaction in the receiver is described hereinafter with interactions between modules and units in the receiver in a case that the receiver does not receive lengths of tails of a frame sent by a transmitter. Referring to FIG. 7, the receiver includes:

an obtaining unit 601, a first determining unit 602, a second determining unit 603 and a receiving unit 604.

The obtaining unit 601 is configured to obtain a start time and an end time of a signal main portion of the frame by timing synchronization. In a case that the frame is a wireless frame, the timing synchronization can be achieved by inserting a synchronization channel, and then the start time and the end time of the signal main portion of the frame are obtained. For example, it is assumed that a synchronization sequence is inserted in an $S_0$-th symbol of the wireless frame, the obtaining unit 601 can detect a synchronization signal via the synchronization sequence only, and achieve the timing synchronization based on the synchronization signal. Then the receiver can calculate the start time $T_{-1}$, which is in the units of time, of the signal main portion of the frame where the synchronization channel locates according to the formula $T_{-1}=T_0-(S_0-1)*M*T_s/2$, and the end time $T_1$, which is in the units of time, of the signal main portion of the frame where the synchronization channel locates according to the formula $T_1=T_0+(N_s-S_0)*M*T_s/2$, where $T_0$ is a start time, captured by the receiver, of the synchronization sequence inserted in the $S_0$-th symbol, M is a quantity of subcarriers in each symbol, $T_s$ is a sampling interval and $N_s$ is a quantity of symbols included in the frame where the synchronization channel locates. The receiver may calculate the start time $N_{-1}$, which is in units of sampling point quantity, of the signal main portion of the frame where the synchronization channel locates according to the formula $N_{-1}=N_0-(S_0-1)*M*/2$, and the end time $N_1$, which is in units of sampling point quantity, of the signal main portion of the frame according to the formula $N_1=N_0+(N_s-S_0)*M/2$, where M is a quantity of subcarriers in each symbol and $N_0$ represents a serial number of a sampling point when the synchronization starts to sample. Then the obtaining unit 601 can send the start time $N_{-1}$ and the end time $N_1$ of the signal main portion to the second determining unit 603.

It should be noted that the way to insert the synchronization is not limited. A corresponding synchronization channel may be inserted in each wireless frame, or synchronizations channel may be inserted by a certain rule, or only the first wireless frame is inserted with a synchronization channel.

Figure 8:
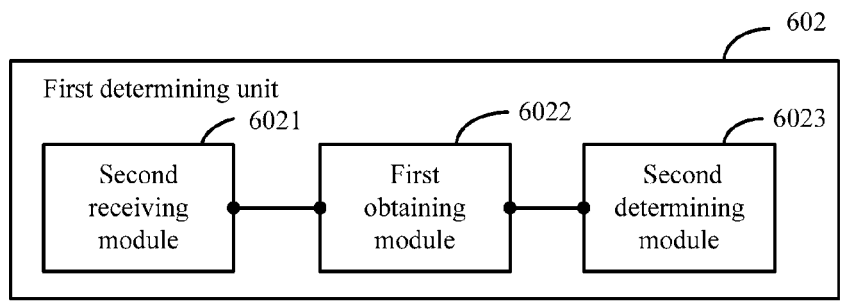
FIG. 8 is a schematic diagram of a first determining unit in the receiver in FIG. 7.

In a case that tails of the frame are non-truncated, referring to FIG. 8, the first determining unit 602 includes: a second receiving module 6021, a first obtaining module 6022 and a second determining module 6023.

The second receiving module 6021 is configured to receive information regarding a filter parameter from a transmitter, and send the information regarding the filter parameter to the first obtaining module 6022.

The first obtaining module 6022 is configured to obtain the filter parameter, and send the filter parameter obtained to the second determining module 6023.

The second determining module 6023 is configured to determine a length of a pre-tail and a length of a post-tail of the frame based on the filter parameter. For example, the second determining module 6023 is configured to calculate the length $T_{pre-tail}$ of the pre-tail and the length $T_{post-tail}$ of the post-tail, which are in the units of time, according to the formula $T_{pre-tail}=T_{post-tail}=(K-1/2)*M*T_s/2$, or calculate the length $N_{pre-tail}$ of the pre-tail and the length $N_{post-tail}$ of the post-tail, which are in the units of sampling point quantity, according to the formula $N_{pre-tail}=N_{post-tail}=(K-1/2)*M/2$, where M is a quantity of subcarriers in each symbol, $T_s$ is the sampling interval and K is a filter overlap coefficient which is a kind of the filter parameter. Then the second determining module 6023 can send the calculated length $T_{pre-tail}$ or $N_{pre-tail}$ of the pre-tail and the calculated length $T_{post-tail}$ or $N_{post-tail}$ of the post-tail to the second determining unit 603.

Figure 9:
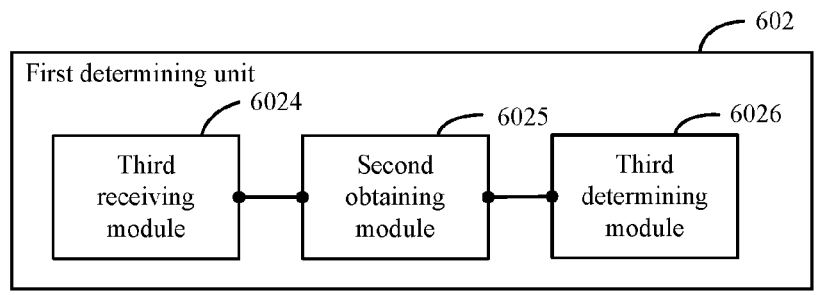
FIG. 9 is another schematic diagram of a first determining unit in the receiver in FIG. 7.
Figure 10:
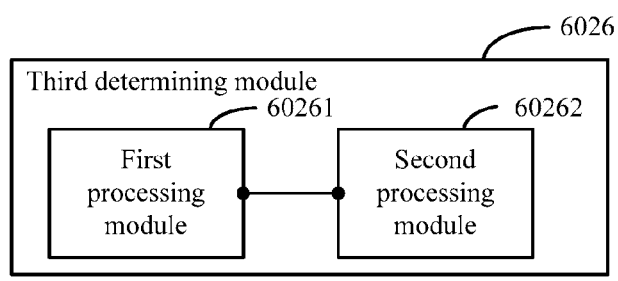
FIG. 10 is a schematic diagram of a third determining module of the receiver in FIG. 9.

In a case that the tails of the frame are truncated, as illustrated in FIGS. 9 and 10, the first determining unit 602 includes: a third receiving module 6024, a second obtaining module 6025 and a third determining module 6026.

The third determining module 6026 includes: a first processing module 60261 and a second processing module 60262.

The third receiving module 6024 is configured to receive from the transmitter information regarding a filter parameter and/or information regarding truncated lengths of the tails and send the information regarding the filter parameter and/or the information regarding the truncated lengths of the tails to the second obtaining module 6025.

The second obtaining module 6025 is configured to obtain the filter parameter and the truncated lengths of the tails and send the filter parameter and the truncated lengths of the tails to the third determining module 6026. The truncated lengths of the tails or the filter parameter may be stored in a memory (which is not illustrated in FIGS. 9 and 10) of the receiver, and the second obtaining module 6025 can directly obtain the filter parameter and/or the truncated lengths of the tails from the memory of the receiver in a case the second obtaining module 6025 does not receive the information regarding the filter parameter and/or the information regarding the truncated lengths of the tails from the third receiving module 6024.

The first processing module 60261 is configured to determine for the frame a length of the pre-tail before being truncated and a length of the post-tail before being truncated based on the filter parameter. For example, assuming that the truncated length of the pre-tail is $\Delta T_{pre}$ and the truncated length of the post-tail is $\Delta T_{post}$, the first processing module 60261 calculates the length of the pre-tail before being truncated and the length of the post-tail before being truncated, which are in the units of time, from the formula $(K-1/2)*M*T_s/2$, or calculates the length of the pre-tail before being truncated and the length of the post-tail before being truncated, which are in units of sampling point quantity, from the formula $(K-1/2)*M/2$. Then the first processing module 60261 can send the length of the pre-tail before being truncated and the length of the post-tail before being truncated to the second processing module 60262.

The second processing module 60262 is configured to determine a length of the pre-tail and a length of the post-tail of the frame based on the length of the pre-tail before being truncated and the length of the post-tail before being truncated and the truncated lengths of tails. For example, assuming that the truncated length of the pre-tail is $\Delta T_{pre}$ and the truncated length of the post-tail is $\Delta T_{post}$, the second processing module 60262 is configured to calculate the length $T_{pre-tail}$ of the pre-tail and the length $T_{post-tail}$ of the post-tail, which are in the units of time, according to the formulas $T_{pre-tail}=(K-1/2)*M*T_s/2-\Delta T_{pre}$ and $T_{post-tail}=(K-1/2)*M*T_s/2-\Delta T_{post}$, respectively, or assuming that the truncated length of the pre-tail is $\Delta N_{pre}$ and the truncated length of the post-tail is $\Delta N_{post}$, the second processing module 60262 is configured to calculate the length $N_{pre-tail}$ of the pre-tail and the length $N_{post-tail}$ of the post-tail, which are in units of sampling point quantity, according to the formulas $N_{pre-tail}=(K-1/2)*M/2-\Delta N_{pre}$ and $N_{post-tail}=(K-1/2)*M/2-\Delta N_{post}$, respectively, where M is a quantity of subcarriers in each symbol, $T_s$ is the sampling interval and K is the filter overlap coefficient, which is a kind of the filter parameter. Then the second processing module 60262 can send the length $T_{pre-tail}$ or $N_{pre-tail}$ of the pre-tail and the length $T_{post-tail}$ or $N_{post-tail}$ of the post-tail to the second determining unit 603.

The second determining unit 603 is configured to determine a start time and an end time of a receiving window for the frame based on the start time and the end time of the signal main portion, the length of the pre-tail and the length of the post-tail. In practical applications, a start time of the frame is determined to be the start time of the receiving window for the frame, and an end time of the frame is determined to be the end time of the receiving window for the frame. For example, the second determining unit 603 may calculate the start time $T_{-2}$ and the end time $T_2$ of the frame, which are in the units of time, according to the formulas $T_{-2}=T_{-1}-T_{pre\text{-}tail}$ and $T_2=T_1+T_{post\text{-}tail}$, respectively, or calculate the start time $N_2$ and the end time $N_2$ of the frame, which are in units of sampling point quantity, according to the formulas $N_{-2}=N_1-N_{pre\text{-}tail}$ and $N_2=N_1+N_{post\text{-}tail}$, respectively. Then the second determining unit 603 can send the determined start time and the end time of the receiving window for the frame to the receiving unit 604.

The receiving unit 604 is configured to receive the frame between the start time and the end time of the receiving window for the frame.

In the embodiment, the obtaining unit 601 obtains the start time and the end time of the signal main portion of the frame by timing synchronization; in a case that the tails are non-truncated, the second receiving module 6021, the first obtaining module 6022 and the second determining module 6023 determine the length of the pre-tail and the length of the post-tail of the frame, or in a case that the tails are truncated, the third receiving module 6024, the second obtaining module 6025, the first processing module 60261 and the second processing module 60262 determine the length of the pre-tail and the length of the post-tail of the frame; the second determining unit 603 determines the start time and the end time of the receiving window for the frame based on the start time and the end time of the signal main portion, the length of the pre-tail and the length of the post-tail; and the receiving unit 604 receives the frame during a period from the start time to the end time of the receiving window for the frame, thus the receiver can accurately and completely receive the signal main portion, the pre-tail and the post-tail of the frame, thereby receiving a signal accurately and completely and avoiding affecting the performance of demodulating and decoding.

Figure 11:
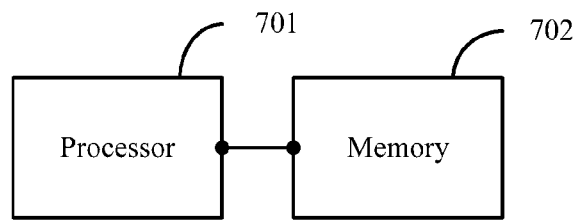
FIG. 11 is a schematic diagram of a receiver according to yet another embodiment of the invention.

A receiver according to an embodiment of the invention is further described below. Referring to FIG. 11, the receiver according to another embodiment of the invention includes:

a processor 701 and a memory 702 configured to store data.

The processor 701 is configured to perform the following steps:

obtaining a start time and an end time of a signal main portion of a frame by timing synchronization, determining a length of a pre-tail and a length of a post-tail of the frame, determining a start time and an end time of a receiving window for the frame based on the start time and the end time of the signal main portion, the length of the pre-tail and the length of the post-tail, and receiving the frame between the start time and the end time of the receiving window for the frame.

In addition to the steps above, the processor 701 is further configured to receive from a transmitter length information of the pre-tail and length information of the post-tail of the frame, and determine the length of the pre-tail and the length of the post-tail of the frame based on the length information of the pre-tail and the length information of the post-tail of the frame.

In addition to the steps above, the processor 701 is further configured to perform the following steps:

receiving information regarding a filter parameter from a transmitter;

obtaining the filter parameter;

determining the length of the pre-tail and the length of the post-tail of the frame based on the filter parameter in a case that the tails of the frame are non-truncated;

receiving from the transmitter information regarding a filter parameter and/or information regarding truncated lengths of the tails, in a case that the tails of the frame are truncated;

obtaining the filter parameter and the truncated lengths of the tails, where the truncated lengths of the tails include a truncated length of the pre-tail and a truncated length of the post-tail;

determining for the frame a length of the pre-tail before being truncated and a length of the post-tail before being truncated based on the filter parameter; and determining the length of the pre-tail and the length of the post-tail of the frame based on the length of the pre-tail before being truncated, the length of the post-tail before being truncated and the truncated lengths of the tails.

Those skilled in the art will clearly appreciate that the corresponding process in method embodiments can be referred to for the operational details of the systems, apparatuses and units described above, which are omitted here for convenience and simplicity of description.

It should be understood that the systems, apparatuses and method disclosed in embodiments of the present invention may be implemented in other ways. For example, the apparatus embodiments described above are illustrative only. For example, The division of the units is merely based on logical functions, and the units may be divided with other approaches in practice. For example, multiple units or modules may be combined, or may be integrated into another system, or some features may be omitted or not be implemented. In addition, the displayed or discussed couplings, direct couplings or communication connections between individual components may be implemented via indirect couplings or communication connections between some interfaces, devices or units, which may be electrical, mechanical or in other forms.

In summary, the embodiments above are only used to illustrate, rather than limit, the technical solutions of the disclosure. Although the disclosure is described in detail with the above embodiments, those in the art shall understand that modifications may be made to the technical solutions according to the embodiments above, or equivalent substitutions may be made to part of the technical features thereof; and the modifications or substitutions do not make the essence of corresponding technical solutions deviate from the spirit and scope of the technical solutions according to the embodiments of the invention.

What is claimed is:

1. A data receiving method comprising:
    obtaining a start time and an end time of a signal main portion of a frame by timing synchronization;
    determining a length of a pre-tail and a length of a post-tail of the frame;
    determining a start time and an end time of a receiving window for the frame based on the start time and the end time of the signal main portion, the length of the pre-tail and the length of the post-tail; and
    receiving the frame between the start time and the end time of the receiving window for the frame.

2. The method according to claim 1, wherein the step of determining the length of the pre-tail and the length of the post-tail of the frame comprises:
    receiving, from a transmitter, length information of the pre-tail and length information of the post-tail of the frame; and determining the length of the pre-tail and the length of the post-tail of the frame based on the length information of the pre-tail and the length information of the post-tail of the frame.

3. The method according to claim 1, wherein the step of determining the length of the pre-tail and the length of the post-tail of the frame comprises:
obtaining a filter parameter; and
determining the length of the pre-tail and the length of the post-tail of the frame based on the filter parameter.

4. The method according to claim 3, before the step of obtaining the filter parameter, further comprising:
receiving information regarding the filter parameter from a transmitter.

5. The method according to claim 1, wherein the step of determining the length of the pre-tail and the length of the post-tail of the frame comprises:
obtaining a filter parameter and truncated lengths of tails; and
determining the length of the pre-tail and the length of the post-tail of the frame based on the filter parameter and the truncated lengths of the tails,
wherein the truncated lengths of the tails comprise a truncated length of the pre-tail and a truncated length of the post-tail.

6. The method according to claim 5, wherein the step of determining the length of the pre-tail and the length of the post-tail of the frame based on the filter parameter and the truncated lengths of the tails comprises:
determining for the frame a length of the pre-tail before being truncated and a length of the post-tail before being truncated based on the filter parameter; and
determining the length of the pre-tail and the length of the post-tail of the frame based on the length of the pre-tail before being truncated, the length of the post-tail before being truncated and the truncated lengths of the tails.

7. The method according to claim 5, before the step of obtaining the filter parameter and the truncated lengths of the tails, further comprising:
receiving at least one of information regarding the filter parameter and information regarding the truncated lengths of the tails, from the transmitter.

8. A receiver comprising:
an obtaining unit, configured to obtain a start time and an end time of a signal main portion of a frame by timing synchronization;
a first determining unit, configured to determine a length of a pre-tail and a length of a post-tail of the frame;
a second determining unit, configured to determine a start time and an end time of a receiving window for the frame based on the start time and the end time of the signal main portion, the length of the pre-tail and the length of the post-tail; and
a receiving unit, configured to receive the frame between the start time and the end time of the receiving window for the frame.

9. The receiver according to claim 8, wherein the first determining unit comprises:
a first receiving module, configured to receive, from a transmitter, length information of the pre-tail and length information of the post-tail of the frame; and
a first determining module, configured to determine the length of the pre-tail and the length of the post-tail of the frame based on the length information of the pre-tail and the length information of the post-tail of the frame.

10. The receiver according to claim 8, wherein the first determining unit comprises:
a first obtaining module, configured to obtain a filter parameter; and
a second determining module, configured to determine the length of the pre-tail and the length of the post-tail of the frame based on the filter parameter.

11. The receiver according to claim 10, wherein the first determining unit further comprises:
a second receiving module, configured to receive information regarding the filter parameter from a transmitter.

12. The receiver according to claim 8, wherein the first determining unit comprises:
a second obtaining module, configured to obtain a filter parameter and truncated lengths of tails; and
a third determining module, configured to determine the length of the pre-tail and the length of the post-tail of the frame based on the filter parameter and the truncated lengths of the tails,
wherein the truncated lengths of the tails comprises a truncated length of the pre-tail and a truncated length of the post-tail.

13. The receiver according to claim 12, wherein the third determining module comprises:
a first processing module, configured to determine for the frame a length of the pre-tail before being truncated and a length of the post-tail before being truncated based on the filter parameter; and
a second processing module, configured to determine the length of the pre-tail and the length of the post-tail of the frame based on the length of the pre-tail before being truncated, the length of the post-tail before being truncated and the truncated lengths of the tails.

14. The receiver according to claim 12, wherein the first determining unit further comprises:
a third receiving module, configured to receive at least one of information regarding the filter parameter and information regarding the truncated lengths of the tails, from the transmitter.

15. A receiver comprising:
a processor and
a memory configured to store codes,
wherein the processor is configured to perform the following steps when executing the codes:
obtaining a start time and an end time of a signal main portion of a frame by timing synchronization,
determining a length of a pre-tail and a length of a post-tail of the frame,
determining a start time and an end time of a receiving window for the frame based on the start time and the end time of the signal main portion, the length of the pre-tail and the length of the post-tail, and
receiving the frame between the start time and the end time of the receiving window for the frame.

16. The receiver according to claim 15, wherein, the processor is further configured to
receive length information of the pre-tail and length information of the post-tail of the frame, sent from a transmitter, and
determine the length of the pre-tail and the length of the post-tail of the frame based on the length information of the pre-tail and the length information of the post-tail of the frame.

17. The receiver according to claim 15, wherein, the processor is further configured to
obtain a filter parameter, and
determine the length of the pre-tail and the length of the post-tail of the frame based on the filter parameter.

18. The receiver according to claim 17, wherein, the processor is further configured to receive information regarding the filter parameter from a transmitter.

19. The receiver according to claim 15, wherein, the processor is further configured to
- obtain a filter parameter and truncated lengths of tails, and
- determine the length of the pre-tail and the length of the post-tail of the frame based on the filter parameter and the truncated lengths of the tails,
- wherein the truncated lengths of the tails comprise a truncated length of the pre-tail and a truncated length of the post-tail.

20. The receiver according to claim 19, wherein, the processor is further configured to
- determine for the frame a length of the pre-tail before being truncated and a length of the post-tail before being truncated based on the filter parameter, and
- determine the length of the pre-tail and the length of the post-tail of the frame based on the length of the pre-tail before being truncated, the length of the post-tail before being truncated and the truncated lengths of the tails.

* * * * *